United States Patent
Nemoto et al.

(10) Patent No.: US 9,917,487 B2
(45) Date of Patent: Mar. 13, 2018

(54) ROTATING ELECTRIC MACHINE AND ELECTRICALLY DRIVEN VEHICLE

(71) Applicant: Hitachi Automotive Systems, Ltd., Hitachinaka-shi, Ibaraki (JP)

(72) Inventors: Kanako Nemoto, Tokyo (JP); Hidetoshi Koka, Tokyo (JP); Yutaka Matsunobu, Hitachinaka (JP); Yasuyuki Saito, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 249 days.

(21) Appl. No.: 14/778,820

(22) PCT Filed: Jan. 22, 2014

(86) PCT No.: PCT/JP2014/051174
§ 371 (c)(1),
(2) Date: Sep. 21, 2015

(87) PCT Pub. No.: WO2014/148093
PCT Pub. Date: Sep. 25, 2014

(65) Prior Publication Data
US 2016/0056684 A1    Feb. 25, 2016

(30) Foreign Application Priority Data

Mar. 21, 2013 (JP) .................. 2013-058318

(51) Int. Cl.
*H02K 1/06*  (2006.01)
*H02K 5/24*  (2006.01)
(Continued)

(52) U.S. Cl.
CPC ................. *H02K 5/24* (2013.01); *H02K 1/16* (2013.01); *H02K 21/14* (2013.01); *H02K 29/03* (2013.01); *Y02T 10/641* (2013.01)

(58) Field of Classification Search
CPC ............................... H02K 1/16; H02K 17/12
(Continued)

(56) References Cited

U.S. PATENT DOCUMENTS 6,424,073 B1 * 7/2002 Kometani ................ H02K 1/16
310/179
2005/0046304 A1    3/2005 Tamaki et al.
(Continued)

FOREIGN PATENT DOCUMENTS

JP          6-113512 A      4/1994
JP          06113512 A  *   4/1994
(Continued)

OTHER PUBLICATIONS

Machine Trnaslation JP06113512 (1994).*
(Continued)

*Primary Examiner* — Jose Gonzalez Quinones
(74) *Attorney, Agent, or Firm* — Crowell & Moring LLP

(57) ABSTRACT

A rotating electric machine allowing a rotor and a stator thereof to assume any of various numbers of poles and any of various numbers of slots and enabling a reduction in vibration and noise is provided. The rotating electric machine according to the present invention includes a stator having a plurality of teeth and a plurality of slots, which is configured so that the shape of the front ends of the teeth and the opening width of the slots are made to change cyclically F times along the circumferential direction (F is a natural number equal to or greater than 2).

3 Claims, 14 Drawing Sheets

(51) Int. Cl.
*H02K 21/14* (2006.01)
*H02K 1/16* (2006.01)
*H02K 29/03* (2006.01)

(58) Field of Classification Search
USPC ..... 310/216.072, 216.073, 216.091, 216.092
See application file for complete search history.

(56) References Cited

U.S. PATENT DOCUMENTS

2009/0243423 A1* 10/2009 Hattori .................. H02K 1/165
310/216.092
2013/0069473 A1 3/2013 Miyata et al.

FOREIGN PATENT DOCUMENTS

| JP | 3490659 B2 | 1/2004 |
| JP | 2005-73450 A | 3/2005 |
| JP | 2007-166710 A | 6/2007 |
| JP | 2009-247196 A | 10/2009 |
| JP | 2012-210105 A | 10/2012 |
| JP | 2014-23258 A | 2/2014 |

OTHER PUBLICATIONS

International Search Report (PCT/ISA/210) issued in PCT Application No. PCT/JP2014/051174 dated Apr. 22, 2014 with English-language translation (two (2) pages).

* cited by examiner

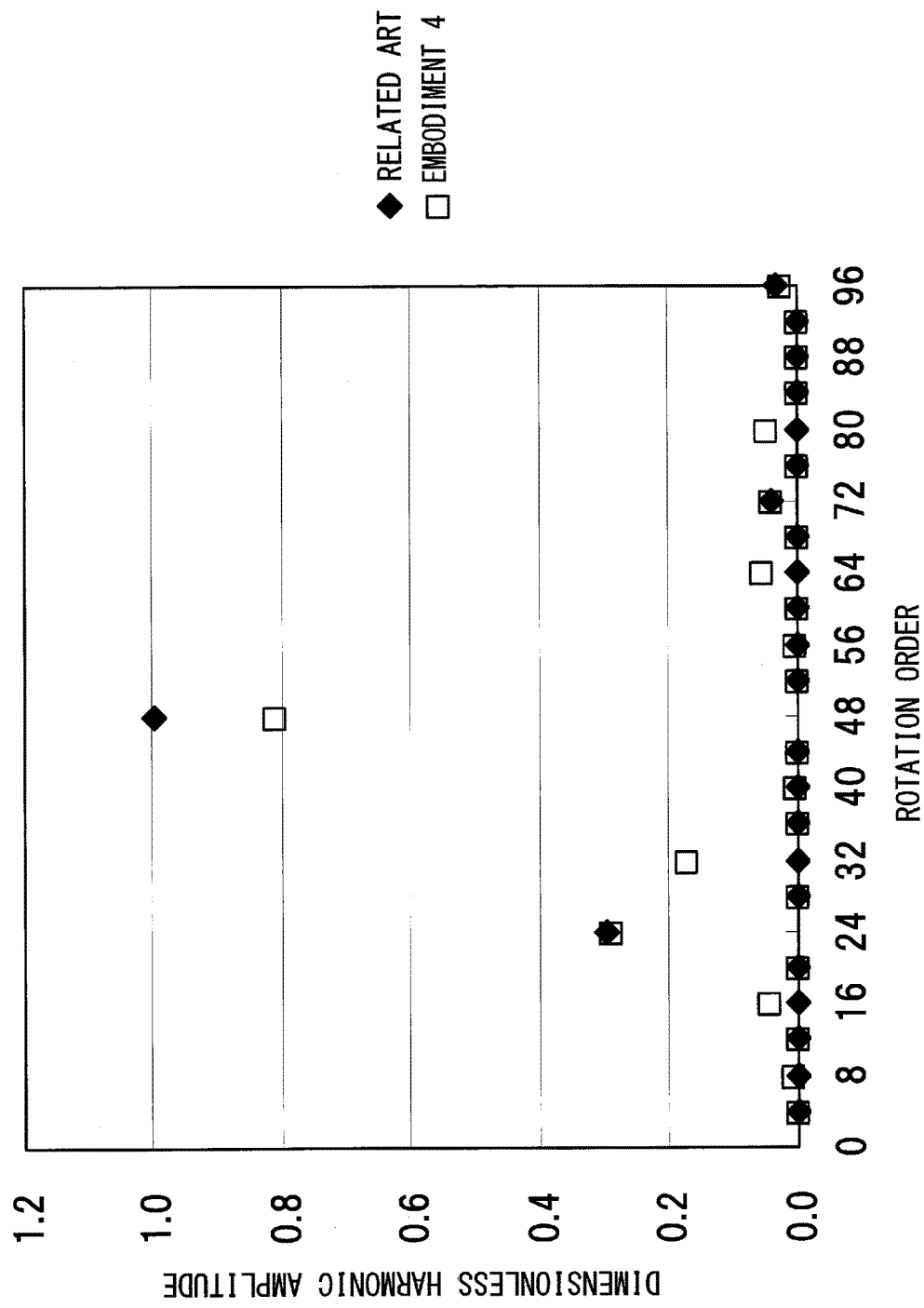

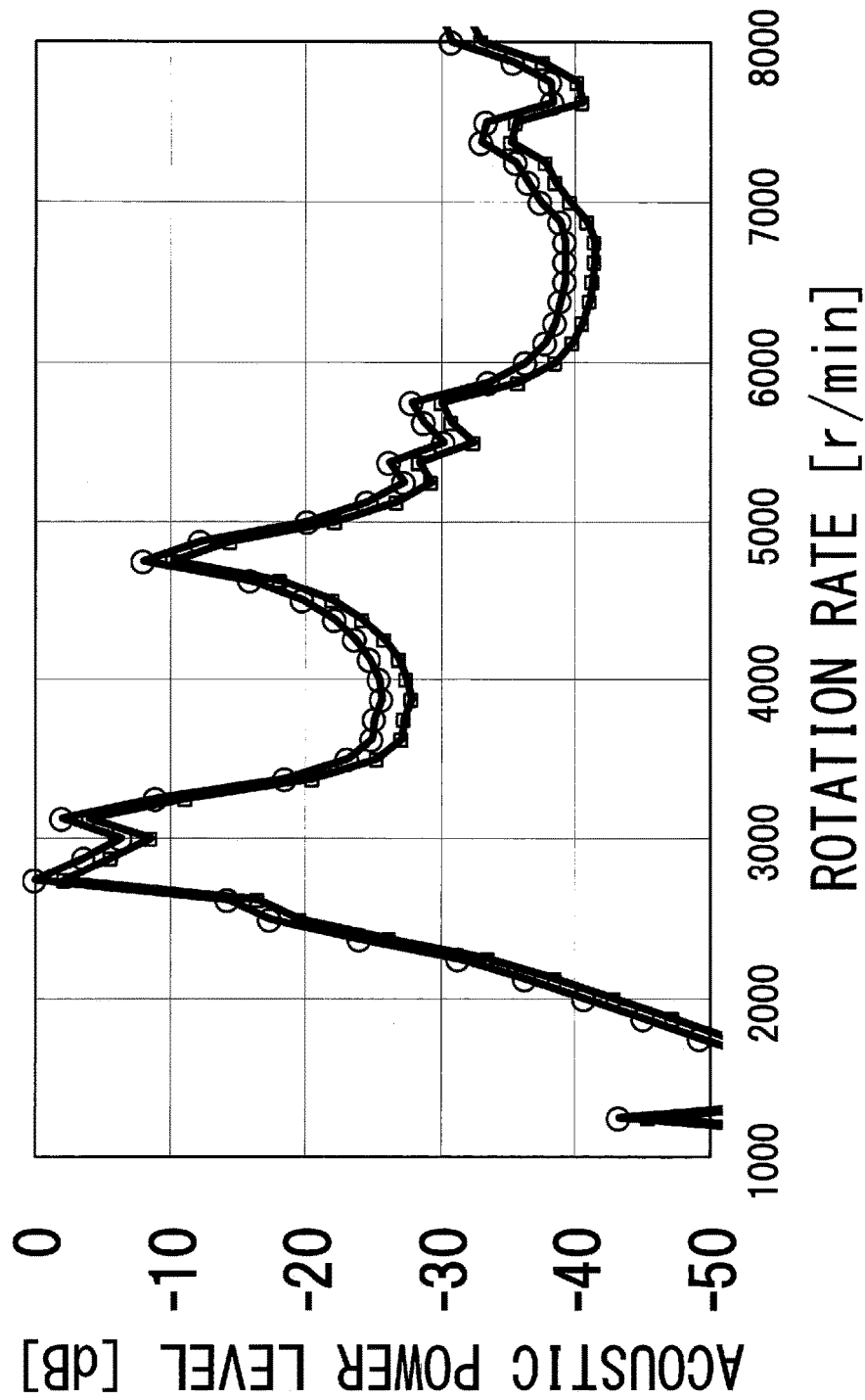

ROTATING ELECTRIC MACHINE AND ELECTRICALLY DRIVEN VEHICLE

TECHNICAL FIELD

The present invention relates to a rotating electric machine and an electrically driven (electric-propulsion) vehicle having installed therein a rotating electric machine.

BACKGROUND ART

The present invention relates to a rotating electric machine used in traveling drive of an electrically driven vehicle such as an HEV or an EV.

Rotating electric machines used in applications such as home appliance products and various types of OA devices have come to be used in recent years in electrically driven vehicles such as hybrid vehicles (HEVs) and electric vehicles (EVs).

The rotating electric machine for an electrically driven vehicle such as an HEV or an EV in particular, must be able to provide large output. At the rotating electric machine for electrically driven vehicle application, which is engaged in operation over a wide rotation-rate range, the excitation frequency of the electromagnetic exciting force changes over a wide range and the natural frequency of vibration inherent to the structure of the rotating electric machine and the excitation frequency match at a specific rotation rate. For this reason, the occurrence of vibration and noise attributable to resonance is inevitable.

At the same time, there is an ongoing pursuit of improvement in the cabin environment with an attendant increase in the need for lessened vibration and noise. This has led to the development of numerous technologies for reducing vibration and noise originating from the rotating electric machine.

The electromagnetic exciting force, which causes vibration and noise originating from the rotating electric machine, works along three directions, i.e., the radial direction, the tangential direction and the axial direction. In order to reduce noise in the audible band, in particular, the amplitudes of harmonics in such electromagnetic exciting forces must be reduced.

The AC rotating electric machine disclosed in PTL 1, at which the number of slots formed in correspondence to a single pole in a given phase is two, openings (01, 02) at the individual slots are formed so that the intervals between centerlines A extending along the radial direction through slot openings formed next to one another are not uniform and a first three-phase stator winding and a second three-phase stator winding are installed at the stator core with a phase difference of 31° through 34° in electrical angle, succeeds in reducing the electromagnetic sound of 12f components of harmonics and as well as the sound of wind. The number of slots that can be formed at a stator core to adopt this invention is limited by a function of the number of phases and the number of poles, and thus, the technology must be further finessed in order for it to be adopted in stator cores with any numbers of slots free of such restrictions.

CITATION LIST

Patent Literature

PTL 1: Japanese Patent No. 3490659

SUMMARY OF INVENTION

Technical Problem

The method proposed in the related art, through which noise caused by electromagnetic vibration is reduced by altering the shapes and pitches of the teeth formed on the stator side, does not assure enough flexibility to allow it to be adopted in conjunction with varying numbers of poles and varying numbers of teeth (slots) at the stator that may be formed in different combinations.

Solution to Problem

One aspect of the invention provides a rotating electric machine having a stator with a plurality of teeth and a plurality of slots, characterized in that the shape at front end areas of the teeth and the width of openings formed at the slots cyclically change F times (F is a natural number equal to or greater than 2) along the circumferential direction.

Advantageous Effects of Invention

According to the present invention, the amplitude of harmonics of the electromagnetic exciting force occurring along the tangential direction, which would lead to vibration and noise, can be reduced without having to alter the periodic boundary conditions, and as a result, vibration and noise occurring in the rotating electric machine can be reduced.

DESCRIPTION OF EMBODIMENTS

Figure 1:
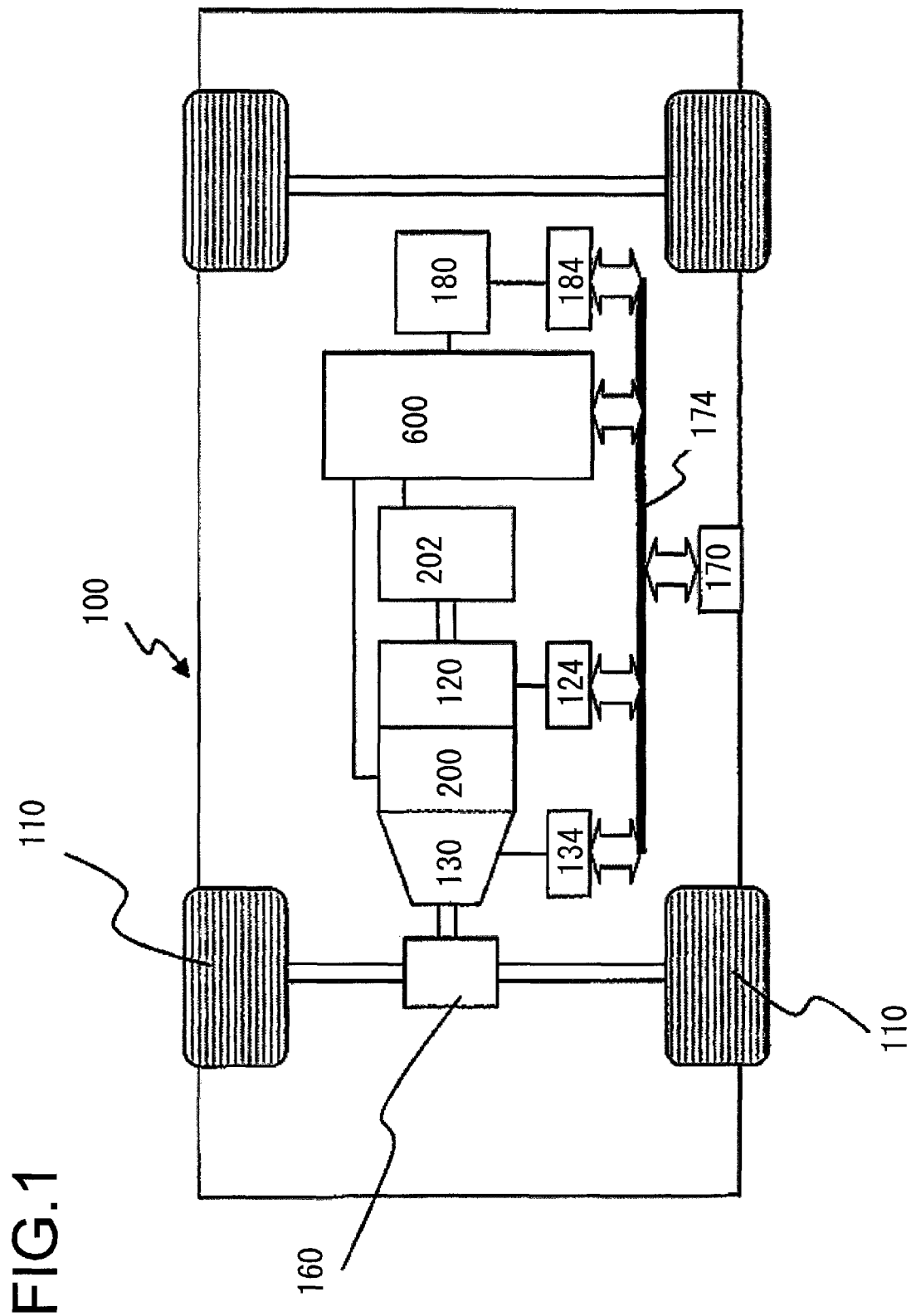
FIG. 1 A schematic diagram showing the structure of a hybrid electric vehicle having installed therein a rotating electric machine achieved in an embodiment of the present invention FIG. 2 A circuit diagram pertaining to the power conversion device 600

FIG. 1 is a schematic illustration showing the structure of a hybrid type electric vehicle having installed therein rotating electric machines achieved in an embodiment. An engine 120, a first rotating electric machine 200, a second rotating electric machine 202 and a battery 180 are mounted at a vehicle 100. When a drive force generated via the rotating electric machines 200 and 202 is needed, the battery 180 provides DC power to a power conversion device (inverter device) 600 engaged in drive of the rotating electric machines 200 and 202, and the power conversion device 600 converts the DC power supplied thereto to AC power which is then provided to the rotating electric machines 200 and 202 individually. During a regenerative traveling operation, on the other hand, the rotating electric machines 200 and 202 generate AC power by using the kinetic energy imparted by the vehicle and provide the AC power thus generated to the power conversion device 600. The power conversion device 600 then converts the AC power to DC power and provides the DC power to the battery 180. In addition, although not shown, a battery that provides low-voltage power (e.g., 14 V power) is installed in the vehicle so as to supply constant-voltage DC power to the control circuits to be described below.

Rotational torque generated via the engine 120 and the rotating electric machines 200 and 202 is transmitted to front wheels 110 via a transmission 130 and a differential gear unit 132. The transmission 130 is controlled by a transmission control device 134, whereas the engine 120 is controlled by an engine control device 124. The battery 180 is controlled by a battery control device 184. The transmission control device 134, the engine control device 124, the battery control device 184, the power conversion device 600 and an integrated control device 170 are connected with one another via a communication line 174.

The integrated control device 170 receives, via the communication line 174, information originating from the transmission control device 134, the engine control device 124, the power conversion device 600 and the battery control device 184, indicating the statuses at the individual control devices which are lower-order control devices relative to the integrated control device 170. Based upon the information thus received, the integrated control device 170 generates, through arithmetic operation, a control command for each corresponding control device. The control command generated through the arithmetic operation is then transmitted to the particular control device via the communication line 174.

The high-voltage battery 180, constituted with secondary battery cells such as lithium ion battery cells or nickel hydride battery cells, is capable of outputting high-voltage DC power in a range of 250 to 600 V or higher. The battery control device 184 outputs, via the communication line 174, information indicating the state of discharge in the battery 180 and the states of the individual battery cell units constituting the battery 180 to the integrated control device 170.

Upon judging, based upon the information provided by the battery control device 184, that the battery 180 needs to be charged, the integrated control device 170 issues a power generation operation instruction for the power conversion device 600. The primary functions of the integrated control device 170 further include management of torque output from the engine 120 and the rotating electric machines 200 and 202, arithmetic processing executed to calculate the overall torque, representing the sum of the torque output from the engine 120 and the torques output from the rotating electric machines 200 and 202, and to calculate a torque distribution ratio, and transmission of control commands generated based upon the arithmetic processing results to the transmission control device 134, the engine control device 124 and the power conversion device 600. Based upon a torque command issued by the integrated control device 170, the power conversion device 600 controls the rotating electric machines 200 and 202 so as to output torque or generate power as indicated in the command.

The power conversion device 600 includes power semiconductors that constitute inverters via which the rotating electric machines 200 and 202 are engaged in operation. The power conversion device 600 controls switching operation of the power semiconductors based upon a command issued by the integrated control device 170. As the power semiconductors are engaged in the switching operation as described above, the rotating electric machines 200 and 202 are each driven to operate as an electric motor or as a power generator.

When engaging the rotating electric machines 200 and 202 in operation as electric motors, DC power provided from the high-voltage battery 180 is supplied to DC terminals of the inverters in the power conversion device 600. The power conversion device 600 controls the switching operation of the power semiconductors so as to convert the DC power supplied to the inverters to three-phase AC power and provide the three-phase AC power to the rotating electric machines 200 and 202. When engaging the rotating electric machines 200 and 202 in operation as generators, the rotors of the rotating electric machines 200 and 202 are rotationally driven with a rotational torque applied thereto from the outside and thus, three-phase AC power is generated at the stator windings of the rotating electric machines 200 and 202. The three-phase AC power thus generated is converted to DC power in the power conversion device 600 and the high-voltage battery 180 is charged with the DC power supplied thereto.

It is to be noted that the rotating electric machine 200 and the rotating electric machine 202 are controlled independently of each other. For instance, when the rotating electric machine 200 is engaged in operation as an electric motor, the rotating electric machine 202 may operate as a motor or as a generator, or it may remain in an operation OFF state. This principle obviously applies to the rotating electric machine 200 as well. The integrated control device 170 determines a specific mode in which the rotating electric machine 200 and the rotating electric machine 202 are to be engaged in operation and issues a command for the power conversion device 600 accordingly. Based upon this command, the power conversion device 600 enters a motor operation mode, a generator operation mode or an operation OFF mode.

Figure 2:
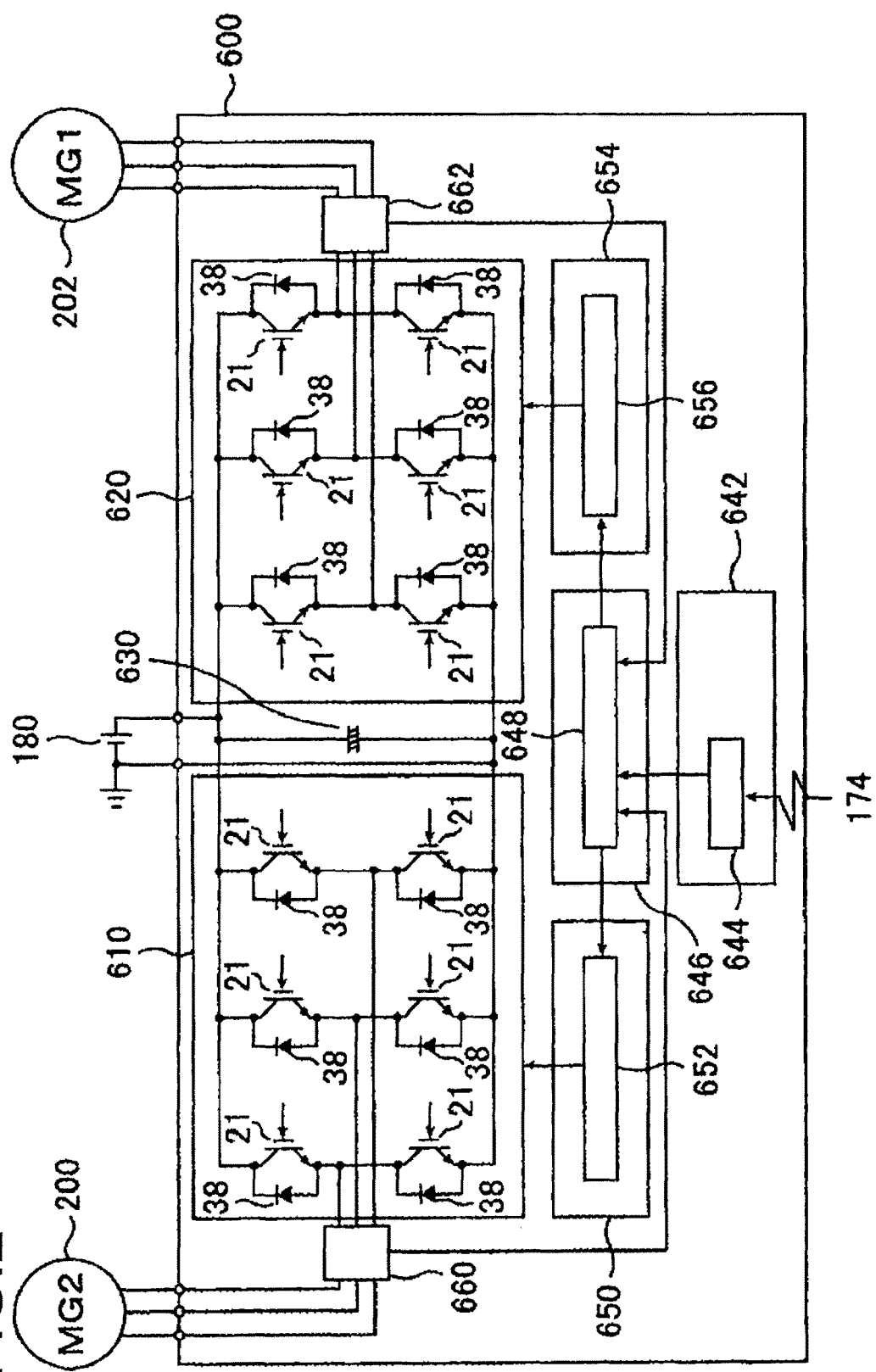

FIG. 2 is a conceptual circuit diagram pertaining to the power conversion device 600 shown in FIG. 1. The power conversion device 600 includes a first inverter device for the rotating electric machine 200 and a second inverter device for the rotating electric machine 202. The first inverter device comprises a power module 610, a first drive circuit 652 that controls switching operation of power semiconductors 21 in the power module 610 and a current sensor 660 that detects an electric current at the rotating electric machine 200. The drive circuit 652 is disposed at a drive circuit board 650. The second inverter device comprises a power module 620, a second drive circuit 656 that controls switching operation of power semiconductors 21 in the power module 620 and a current sensor 662 that detects an electric current at the rotating electric machine 202. The drive circuit 656 is disposed at a drive circuit board 654. A control circuit 648 disposed at a control circuit board 646, a capacitor module 630 and a transmission/reception circuit 644 mounted at a connector board 642 are all shared by the first inverter device and the second inverter device.

The power modules 610 and 620 are engaged in operation with drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating electric machine 200 or 202. In addition, the power modules 610 and 620 convert AC power induced at the stator windings of the rotating electric machines 200 and 202 to DC power and provide the DC power resulting from the conversion to the high-voltage battery 180.

As indicated in FIG. 2, the power modules 610 and 620 each include a three-phase bridge circuit constituted with serial circuits each corresponding to one of the three phases electrically connected in parallel between the positive pole side and the negative pole side of the battery 180. Each serial circuit includes a power semiconductor 21 constituting an upper arm and a power semiconductor 21 constituting a lower arm connected in series. Since the power module 610 and the power module 620 adopt circuit structures substantially identical to each other as shown in FIG. 2, the following description focuses on the power module 610 chosen as a representative example.

The switching power semiconductor elements used in the embodiment are IGBTs (insulated gate bipolar transistors) 21. An IGBT 21 includes three electrodes; a collector electrode, an emitter electrode and a gate electrode. A diode 38 is electrically connected between the collector electrode and the emitter electrode of the IGBT 21. The diode 38 includes two electrodes; a cathode electrode and an anode electrode, with the cathode electrode electrically connected to the collector electrode of the IGBT 21 and the anode electrode electrically connected to the emitter electrode of the IGBT 21 so as to define the direction running from the emitter electrode toward the collector electrode at the IGBT 21 as a forward direction.

It is to be noted that MOSFETs (metal oxide semiconductor field effect transistors) may be used as the switching power semiconductor elements, instead. A MOSFET includes three electrodes; a drain electrode, a source electrode and a gate electrode. The MOSFET does not require a diode 38, such as those shown in FIG. 2, since it includes a parasitic diode with which the direction running from the drain electrode toward the source electrode is defined as the forward direction, present between the source electrode and the drain electrode.

The upper and lower arms in the serial circuit corresponding to a given phase are configured by electrically connecting the source electrode of one IGBT 21 and the drain electrode of another IGBT 21 in series. It is to be noted that while the figure shows the upper arm and the lower arm corresponding to a given phase each constituted with a single IGBT, a large current control capacity needs to be assured in the embodiment and thus, a plurality of IGBTs are connected in parallel to constitute an upper arm or a lower arm in the actual power module. However, for purposes of simplification, the following explanation is given by assuming that each arm is constituted with a single power semiconductor.

In the example presented in FIG. 2, the upper arms or the lower arms, each corresponding to one of the three phases, are configured with three IGBTs. The drain electrode of the IGBT 21 constituting the upper arm in a given phase is electrically connected to the positive pole side of the battery 180, whereas the source electrode of the IGBT 21 constituting the lower arm in a given phase is electrically connected to the negative pole side of the battery 180. A middle point between the arms corresponding to each phase (an area where the source electrode of the upper arm-side IGBT and the drain electrode of the lower arm-side IGBT are connected) is electrically connected to the armature winding (stator winding) at the corresponding phase at the corresponding rotating electric machine 200 or 202.

The drive circuits 652 and 656, constituting drive units via which the corresponding inverter devices 610 and 620 are controlled, generate drive signals used to drive the IGBTs 21 based upon a control signal output from the control circuit 648. The drive signals generated at the individual drive circuits 652 and 656 are respectively output to the gates of the various power semiconductor elements in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter devices 610 and 620, is constituted with a microcomputer that generates, through arithmetic operation, a control signal (a control value) based upon which the plurality of switching power semiconductor elements are engaged in operation (turned on/off). A torque command signal (a torque command value) provided from a higher-order control device, sensor outputs from the current sensors 660 and 662, and sensor outputs from rotation sensors mounted at the rotating electric machines 200 and 202 are input to the control circuit 648. Based upon these signals input thereto, the control circuit 648 calculates control values and outputs control signals to be used to control the switching timing to the drive circuits 652 and 656.

The transmission/reception circuit 644 mounted at the connector board 642, which electrically connects the power conversion device 600 with an external control device, is engaged in information exchange with another device via the communication line 174 shown in FIG. 1. The capacitor module 630, constituting a smoothing circuit via which the extent of DC voltage fluctuation occurring as the IGBTs 21 are engaged in switching operation is reduced, is electrically connected in parallel with DC-side terminals of the first power module 610 and the second power module 620.

Figure 3:
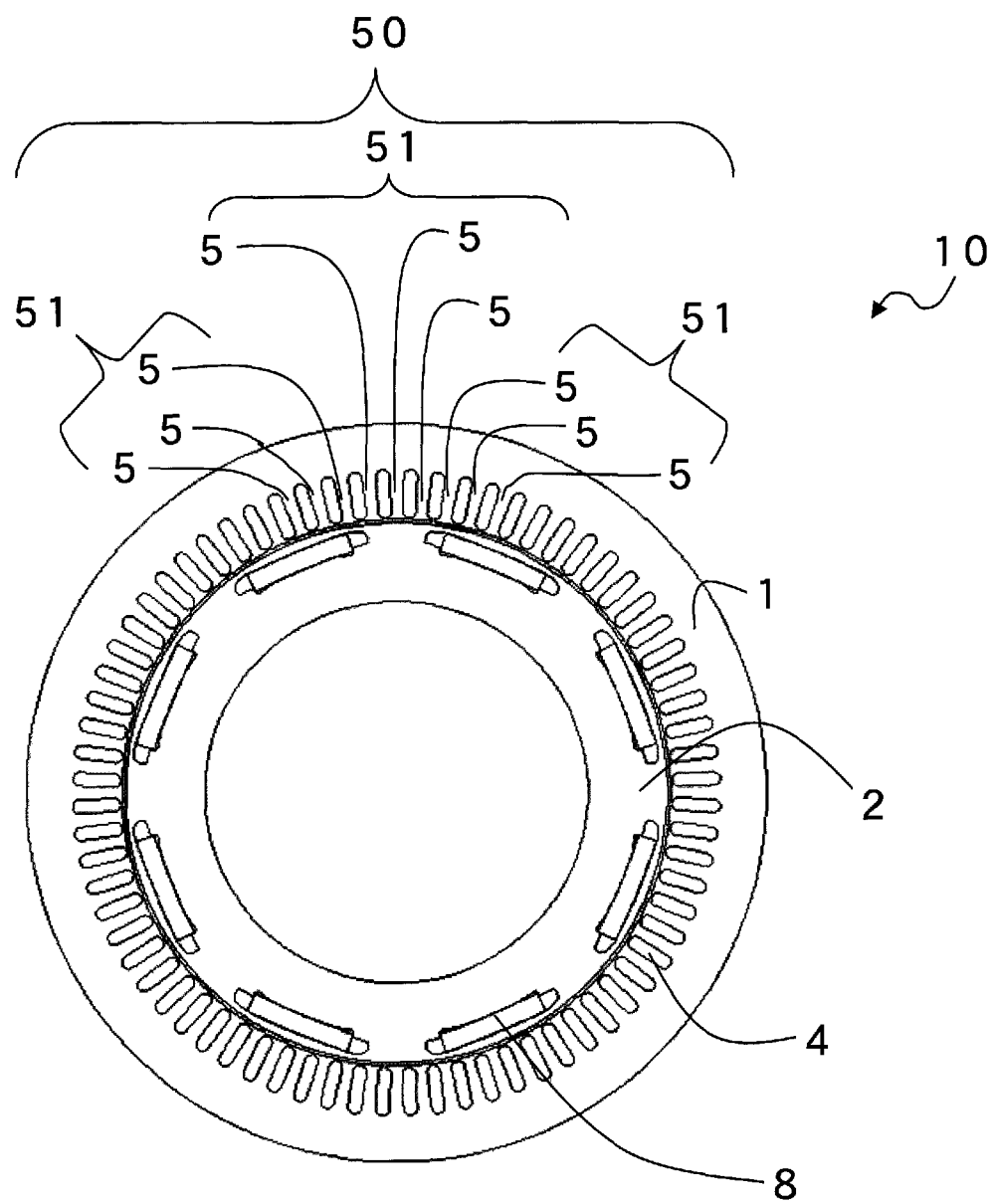
FIG. 3 An illustration of the structure of a permanent magnet motor with eight poles, having a stator core with 72 slots FIG. 4 A diagram showing the configuration of teeth and slots forming a single group, as achieved in embodiment 1 of the rotating electric machine according to the present invention FIG. 5 A diagram showing the configuration of teeth and slots forming a single group, as achieved in embodiment 2 of the rotating electric machine according to the present invention FIG. 6 A diagram showing the configuration of teeth and slots forming a single group, as achieved in embodiment 3 of the rotating electric machine according to the present invention FIG. 7 A diagram presenting computation results with respect to the electromagnetic exciting force harmonics of the 0th-order in space along the tangential direction at rotating electric machines having stator cores with the teeth and the slots thereof formed as in embodiments 1 through 3 and in the related art FIG. 8 An enlarged dB representation of part of the computation results presented in FIG. 7

FIG. 3 is a schematic sectional view of a permanent magnet rotating electric machine 10 configured as an example of the rotating electric machine according to the present invention. This permanent magnet rotating electric machine 10 may be used as the rotating electric machine 200 or the rotating electric machine 202 in the hybrid vehicle (see FIG. 1 and FIG. 2) described above. It is to be noted that as explained later, the structure of the rotating electric machine according to the present invention may be adopted in a synchronous reluctance motor or an induction motor instead of a permanent magnet rotating electric machine.

The structural features characterizing the present invention, as achieved in embodiments 1 through 4, will be described next in reference to FIG. 3 through FIG. 14. It is to be noted that coils are wound at the teeth of the stator through distributed winding in each of the embodiments described below. This means that the computation results presented in FIGS. 7 through 10 and FIGS. 13 and 14 have been obtained in conjunction with coils wound through the distributed winding method.

Embodiment 1

Figure 4:
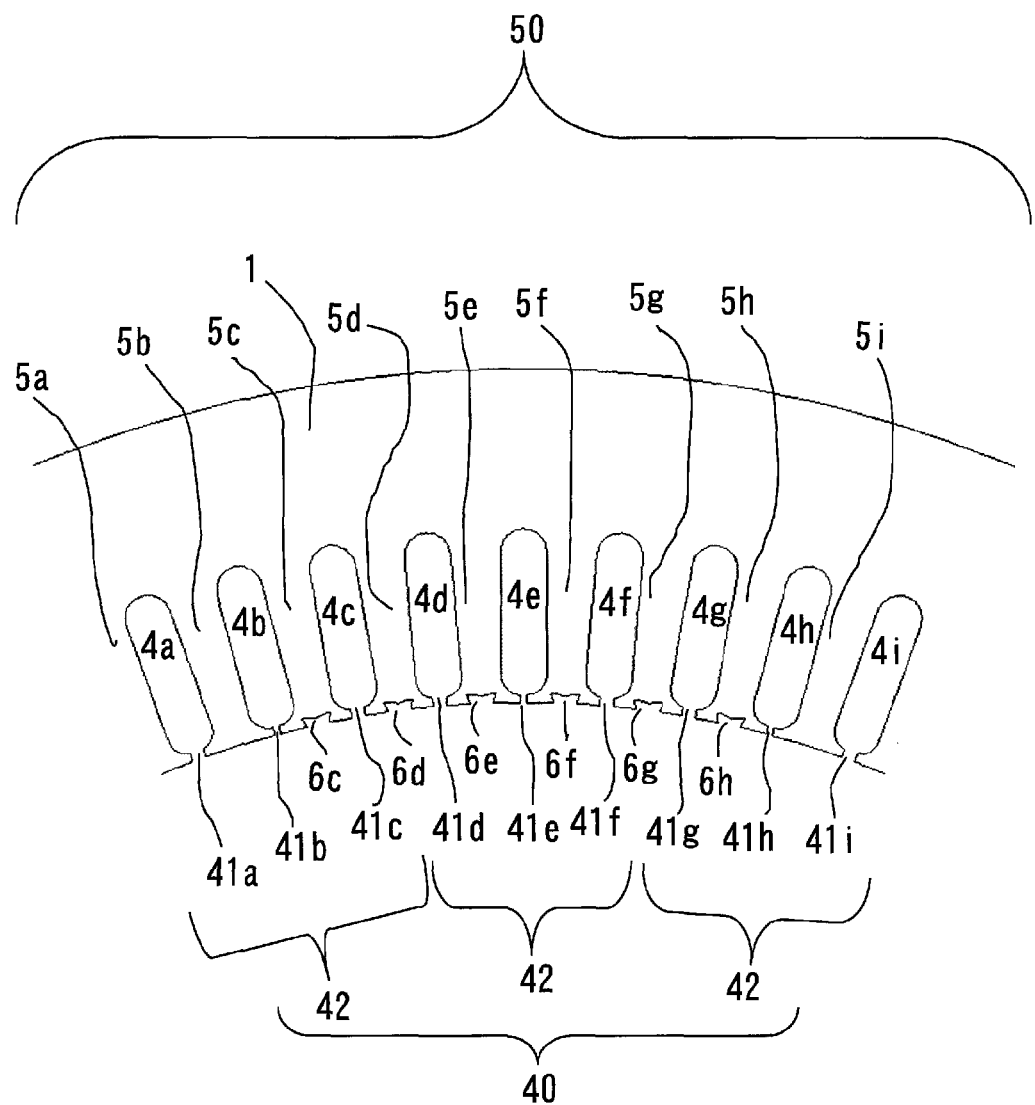

FIG. 3 illustrates embodiment 1 of the rotating electric machine according to the present invention. The rotating electric machine shown in FIG. 3 represents an example in which the present invention is adopted in a three-phase permanent magnet rotating electric machine with eight poles and 72 slots. Each group of teeth may be made up with m (=9) teeth, with m representing the quotient calculated by dividing the number S (=72) of slots at the stator by the greatest common divisor N (=8) of the number of poles P and the number of stator slots S, or with d (=3) teeth, with d representing a divisor of m. The teeth in a single group include a tooth having a groove formed at the front end thereof and a tooth having no such groove, and the slots in the group include those with varying opening widths. FIG. 4 illustrates an example of a shape that may be assumed in grooves formed at the front ends of nine teeth $5a$ to $5i$ making up a single tooth group 50. FIG. 4 also illustrates examples of opening widths that may be assumed at nine slots $4a$ to $4i$ making up a single slot group 40. It is to be noted that unless specifically noted, a given tooth or slot will be simply referred to as a tooth 5 or a slot 4. It is also to be noted that reference numeral 8 indicates a permanent magnet.

FIG. 4 shows the nine teeth $5a$ through $5i$ included in one tooth group 50, with grooves $6c$ through $6h$ formed at the front ends of six teeth $5c$ through $5h$ among the nine teeth. At a stator core 1 shown in FIG. 3, the arrangement of the nine teeth $5a$ through $5i$ in FIG. 4 are iterated cyclically so that there are eight groups of teeth set along the circumferential direction. It is to be noted that FIG. 3 does not include an illustration of the shapes of the front ends of these teeth. In addition, it does not include an illustration of stator coils wound through the slots 4 at the stator core 1 constituting the rotating electric machine 10.

Furthermore, a single slot group 40 is formed with nine slots $4a$ through $4i$ corresponding to the nine teeth $5a$ through $5i$ making up the single tooth group 50 in FIG. 4. The slot group 40 includes slot subgroups 42 each made up with d (=3) slots, with d representing a divisor of m, which is the quotient, obtained by dividing the number of slots S by the greatest common divisor N. The openings at the individual slots are formed so that openings ($41a$, $41d$, $41g$) have equal opening widths, openings ($41b$, $41e$, $41h$) have equal opening widths and openings ($41c$, $41f$, $41i$) have equal opening widths. In addition, slot sub-groups are each made up with the slots $4a$ through $4c$, the slots $4d$ through $4f$ or the slots $4g$ through $4i$. In other words, the m slots in a single slot group 40 may form sub-groups 42, each made up with d (≠m) slots with d representing a divisor of m (see FIG. 4). Likewise, the m teeth 5 in a single tooth group 50 may form sub-groups each made up with d (≠ m) teeth with d representing a divisor of m.

Figure 7:
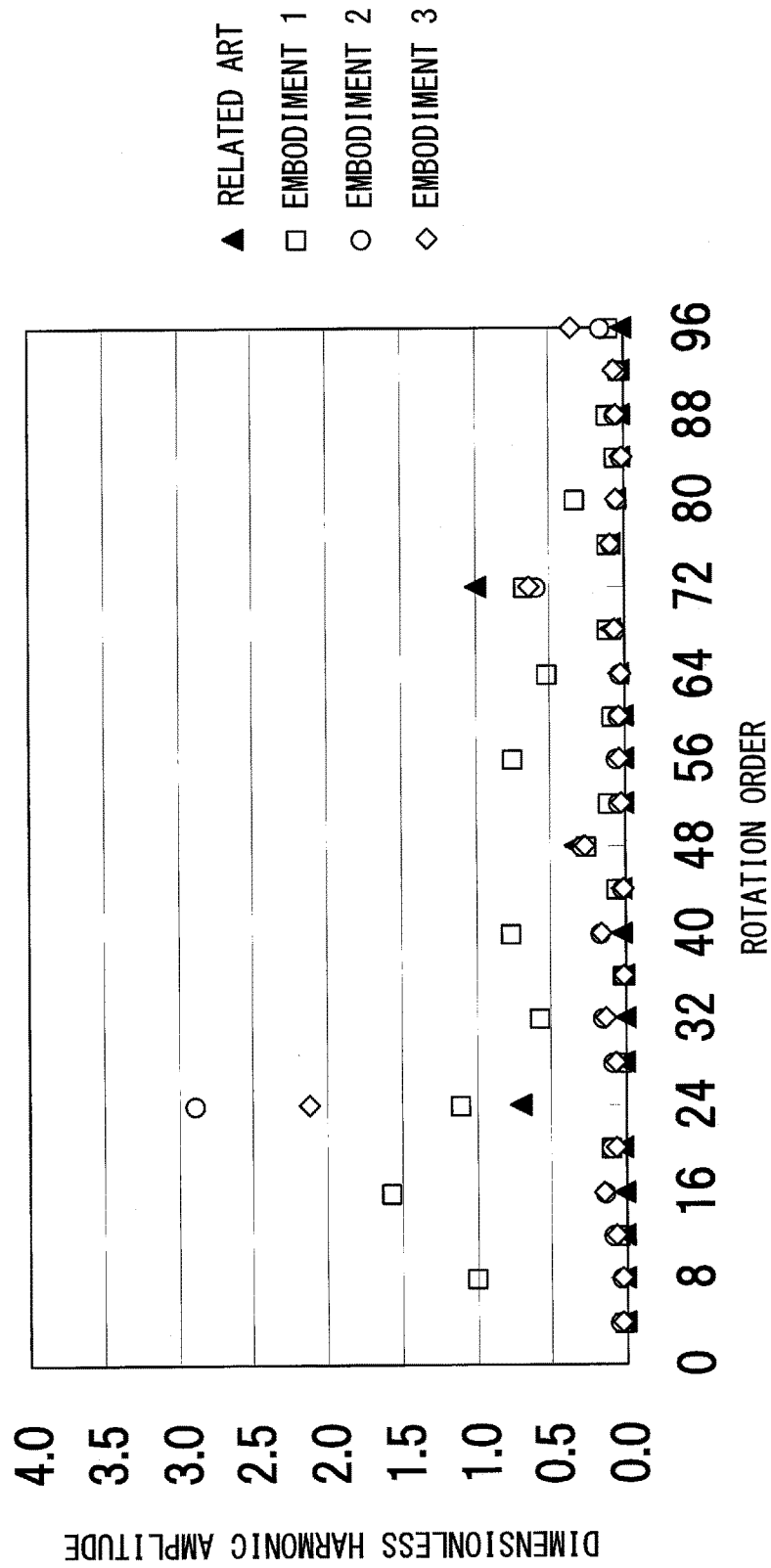

The □ marks in FIG. 7 indicate computation results obtained in conjunction with a rotating electric machine (embodiment 1) that includes the stator core 1, having the tooth groups 50 and the slot groups 40 formed as shown in FIG. 4. It is to be noted that FIG. 7 and FIG. 8 also provide computation results obtained in correspondence to other embodiments (embodiments 2 and 3) and the rotating electric machine having a stator core 1 of the related art, as will be explained later.

Embodiment 2

Figure 5:
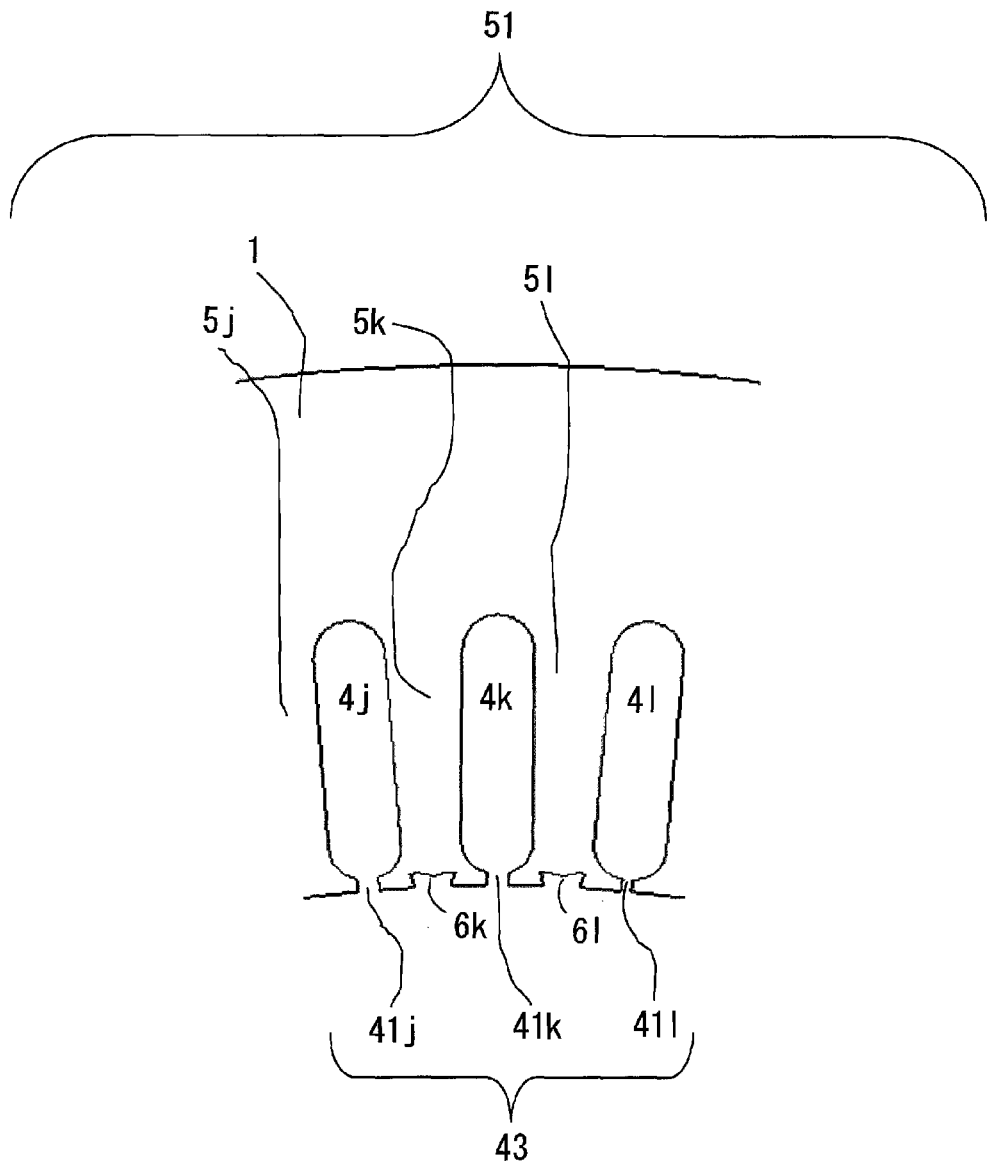

FIG. 5 illustrates embodiment 2 of the rotating electric machine according to the present invention. A single tooth group 51 is made up with three stator teeth $5j$ through $5l$ and a single slot group 43 is made up with three slots $4j$ through $4l$ (with slot openings $41j$ through $41l$). Grooves 6 ($6k$, $6l$) are formed at the front ends of teeth 5 in the tooth group 51, as shown in FIG. 5. In the example presented in FIG. 5, the grooves $6k$ and $6l$ formed at the front ends of the teeth $5k$ and $5l$ have identical shapes. In addition, the slot openings $41j$ and $41k$ have equal opening widths with the slot opening $41l$ having a different opening width in the example presented in FIG. 5. A tooth group 50 such as that shown in FIG. 3 can be formed by disposing the teeth making up the tooth group 51 and the slot group 43 ($4j$ through $4l$) corresponding to the tooth group 51 cyclically along the circumferential direction at the stator core 1 so that three groups of teeth and slots are set side-by-side along the circumference of the stator core 1.

In other words, the stator core 1 shown in FIG. 3 is formed by disposing the teeth 5 and the slots 4 corresponding to a single tooth group 51 shown in FIG. 5 cyclically so that a total of 24 groups are formed side-by-side along the circumferential direction in embodiment 2. The computation results corresponding to this structure (embodiment 2) are indicated with ○ marks in FIG. 7.

Embodiment 3

Figure 6:
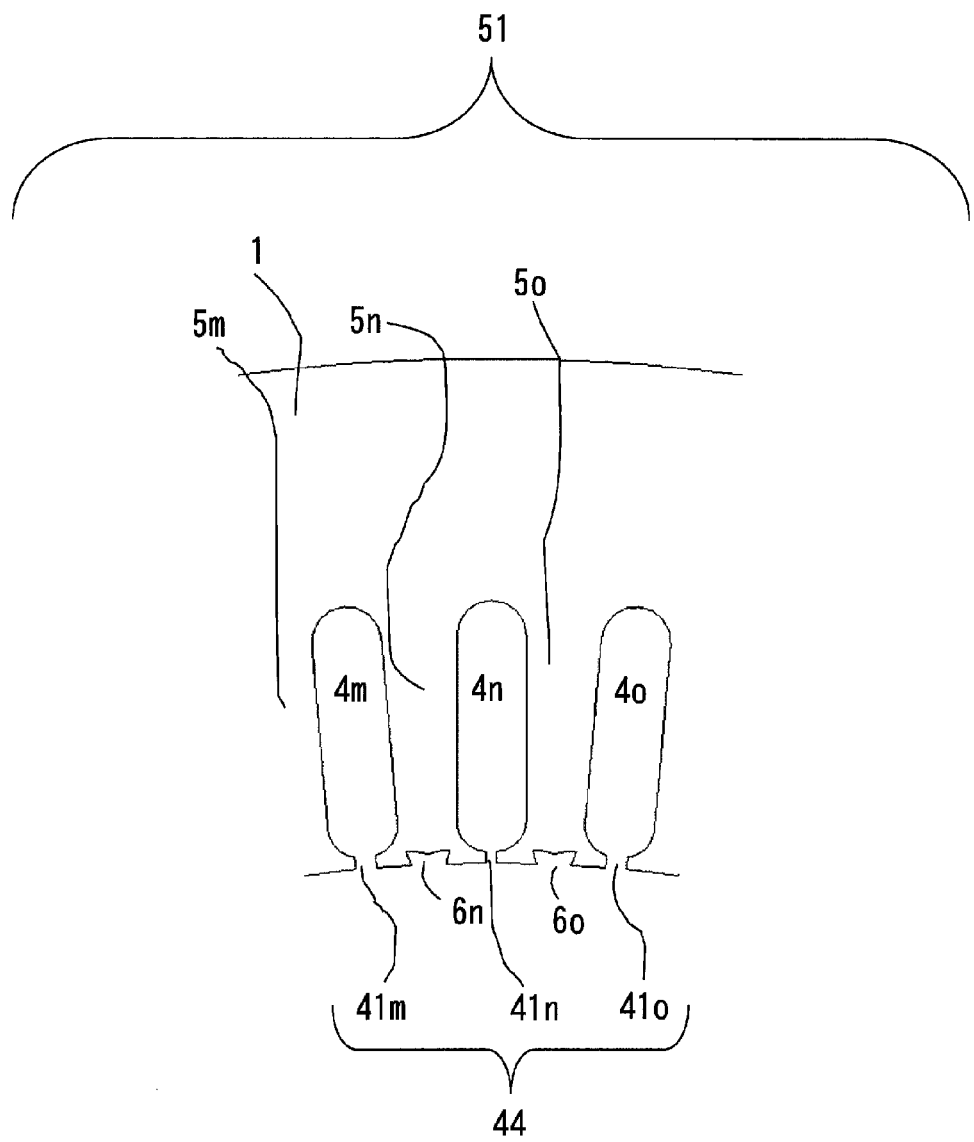

FIG. 6 illustrates embodiment 3 of the rotating electric machine according to the present invention. A single tooth group 51 is made up with three teeth 5m through 5o and a single slot group 44 is made up with three slots 4m through 4o (with slot openings 41m through 41o). Grooves 6 (6n, 6o) are formed at the front ends of the teeth 5 forming the tooth group 51. In the example presented in FIG. 6, the grooves 6n and 6o formed at the front ends of the teeth 5n and 5o have identical shapes. These grooves are formed in a shape identical to that of the grooves 6 (6k and 6l) in FIG. 5. However, the example presented in FIG. 6 is distinguishable from that in FIG. 5 in that the middle slot among the three slots has an opening width different from the opening width of the other slots. Namely, the slot openings 41m and 41o have equal opening widths and the slot opening 41n has an opening width different from the opening width of the other two slot openings.

In the example presented in FIG. 5, the slot openings 41j and 41k have equal opening widths and the slot opening 41l has a different opening width. In the example presented in FIG. 6, the slot openings 41m and 41o have equal opening widths and the slot opening 41n has a different opening width. In other words, the structure shown in FIG. 5 (embodiment 2) and the structure shown in FIG. 6 (embodiment 3) are distinguishable from each other in that the position of the slot opening having an opening width different from that of the other slot openings in the slot group 43 is different from the position of the slot opening having an opening width different from that of the other slot openings in the slot group 44. This means that the pattern with which the shapes of the tooth grooves at the individual teeth forming a given tooth group change and the pattern with which the opening widths at the slot openings in the slot group corresponding to the tooth group change in FIG. 5 are different from those shown in FIG. 6. This may otherwise be described as follows. Namely, the tooth groove shape change pattern and the slot opening width change pattern in FIG. 6 are offset relative to those shown in FIG. 5. It is to be noted that the patterns in the structure shown in FIG. 6, allowing the tooth groove shapes and the slot opening widths to achieve symmetry relative to a radial line passing through the center of the middle slot 4n at the central position in the slot group 44 can be formed by inverse laminating the laminated steel material used to configure the stator core 1.

In embodiment 3, the stator core 1 shown in FIG. 3 is formed by forming the teeth 5 and the slots 4 arranged in a tooth group 51 shown in FIG. 6 cyclically, so that a total of 24 groups are disposed side-by-side along the circumferential direction. The computation results corresponding to this structure (embodiment 3) are indicated with ◇ marks in FIG. 7.

The periodic boundary conditions of the geometric configuration achieved as a combination with a rotor core 2 and the magnets 8 in the related art, in which all the teeth 5 and all the slots 4 have uniform shapes, is defined by the value ⅛. According to the present invention, tooth grooves at the individual teeth in each tooth group are not formed uniformly and/or the opening widths at the openings in each slot group are not all equal. However, by iterating a tooth group 50 or 51 and a slot group 40, 43 or 44, formed as in any of embodiments 1 through 3, along the entire circumference of the stator core 1, the amplitudes of the electromagnetic force harmonics can be adjusted without having to alter the periodic boundary conditions of the geometric configuration achieved as the combination with the rotor core 2 and the magnets 8 from the periodic boundary conditions defined by the value ⅛ in the related art.

In embodiments 1 through 3, the reluctance in the air gap (the space between the inner circumference of the stator core 1 and the outer circumference of the rotor core 2) can be varied by forming grooves at the front ends of teeth 5 and altering the opening width at the slot openings 41. As the reluctance is altered, the amplitudes or the phases of the magnetic flux harmonics change, which, in turn, results in a change in the amplitudes of the electromagnetic force harmonics.

(Effect of Electromagnetic Exciting Force Harmonic Reduction Achieved in the Rotating Electric Machine According to the Present Invention)

FIG. 7 presents results obtained through analysis, indicating the electromagnetic force harmonic amplitudes of the 0th-order in space along the tangential direction at rotating electric machines having stator cores 1 with the teeth and the slots thereof formed as in embodiments 1 through 3 and in the related art. In FIG. 7, the electromagnetic force harmonic amplitudes are rendered dimensionless in reference to the rotation 72nd-order harmonic amplitude in the related art. Pertaining to the related art, FIG. 7 indicates that among the electromagnetic force harmonics of the tangential direction space 0th-order, the electromagnetic force harmonic component of the rotation 72nd-order achieves the largest amplitude and that when the excitation frequency of the electromagnetic harmonic of rotation 72nd-order and the natural frequency of the rotating electric machine excited by this exciting force match, significant vibration and noise occur.

Figure 8:
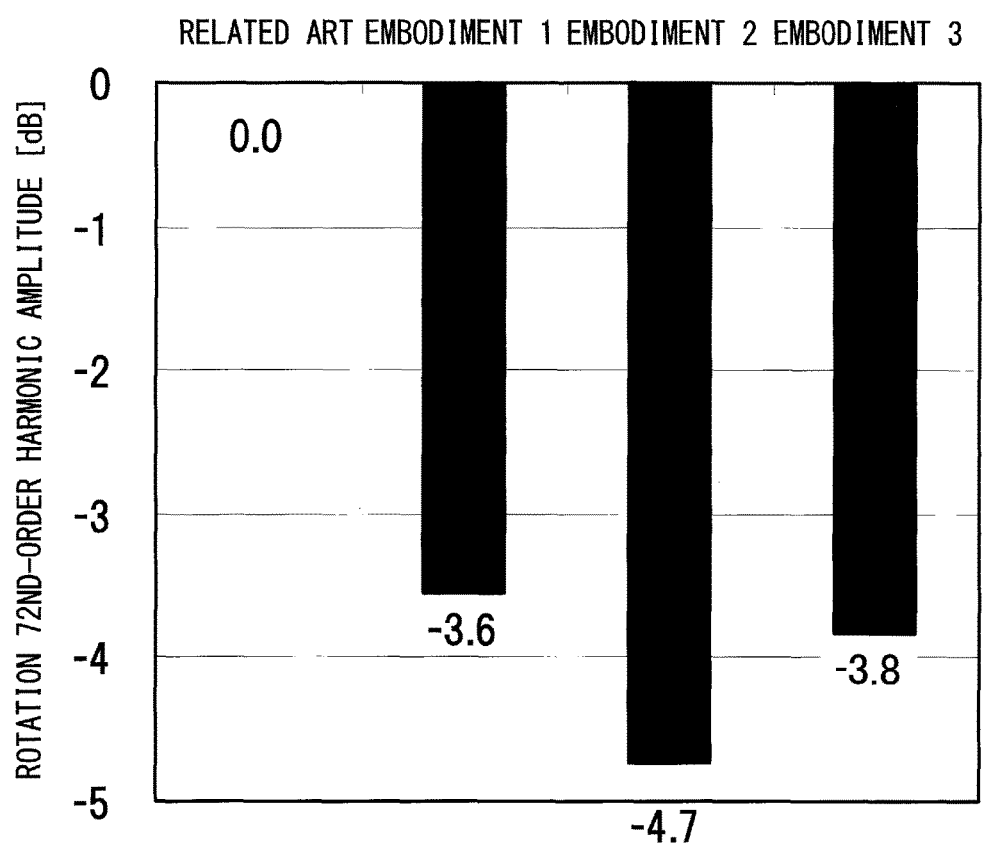

FIG. 8 represents a dB representation of the tangential direction space 0th-order harmonic amplitude of the rotation 72nd-order prepared in view of the above findings. FIG. 8 indicates that the electromagnetic force harmonic amplitude is reduced relative to the related art by 3.6 dB in embodiment 1 by 4.7 dB in embodiment 2 and by 3.8 dB in embodiment 3. This means that through embodiments 1 through 3, vibration and noise caused by the electromagnetic force harmonic of the tangential direction space 0th-order with the rotation 72nd-order can be reduced relative to the vibration and noise occurring in the related art.

Figure 9:
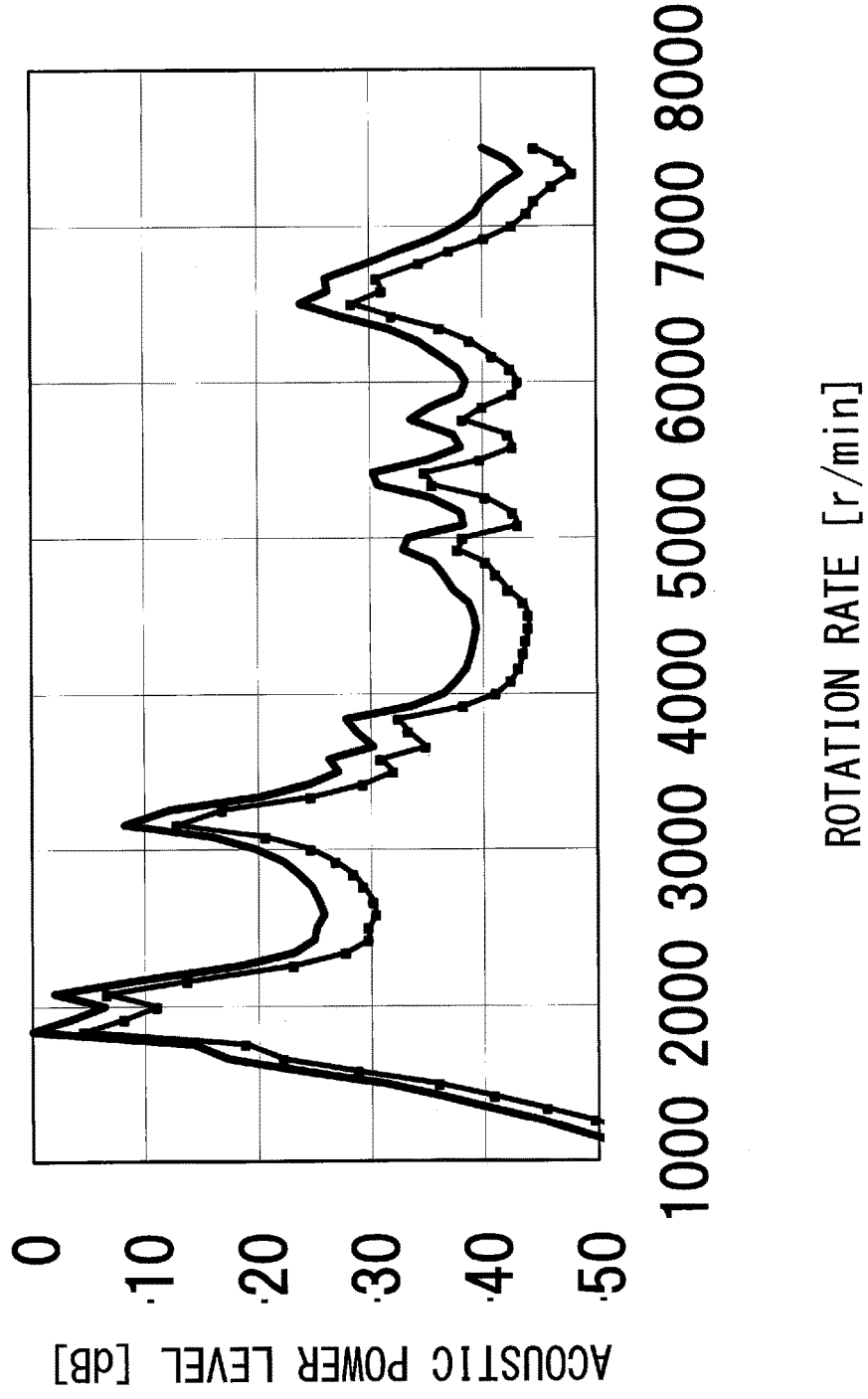
FIG. 9 A diagram presenting computation results with respect to acoustic power levels obtained by inputting an electromagnetic exciting force harmonic of the tangential direction space 0th-order with the rotation 72nd-order in analysis models, one configured with a rotating electric machine having a stator core formed as in embodiment 2 and another with a rotating electric machine having a stator core with the teeth and the slots thereof formed as in the related art FIG. 10 A diagram presenting computation results with respect to acoustic power levels obtained by inputting electromagnetic exciting force harmonics of the tangential direction space 0th-order with the rotation 72nd-order and the rotation 24th-order in analysis models, one configured with a rotating electric machine having a stator core formed as in embodiment 2 and another with a rotating electric machine having a stator core with the teeth and the slots thereof formed as in the related art FIG. 11 An illustration of another structure that may be adopted for a permanent magnet motor with eight poles, having a stator core with 48 slots FIG. 12 A diagram showing the configuration of teeth and slots forming a single group, as achieved in embodiment 4 of the rotating electric machine according to the present invention FIG. 13 A diagram presenting computation results with respect to the electromagnetic exciting force harmonics of the 0th-order in space along the tangential direction at rotating electric machines having stator cores with the teeth and the slots thereof formed as in embodiment 4 and in the related art FIG. 14 A diagram presenting computation results with respect to acoustic power levels obtained by inputting an electromagnetic exciting force harmonic of the tangential direction space 0th-order with the rotation 48th-order in analysis models, one configured with a rotating electric machine having a stator core formed as in embodiment 4 and another with a rotating electric machine having a stator core with the teeth and the slots thereof formed as in the related art

FIG. 9 presents computation results obtained with regard to levels of acoustic power generated from rotating electric machines, one equipped with a stator core 1 having teeth and slots formed as in embodiment 2 and another equipped with a stator core 1 having teeth and slots formed as in the related art, by inputting an electromagnetic force harmonic of the tangential direction space 0th-order with the rotation 72nd-order. In FIG. 9, the acoustic power levels are rendered dimensionless in reference to the acoustic power level maximum value in the related art. FIG. 9 indicates that the acoustic power level peak manifesting in the vicinity of 2000 rpm is lowered relative to the acoustic power level peak in the related art.

Figure 10:
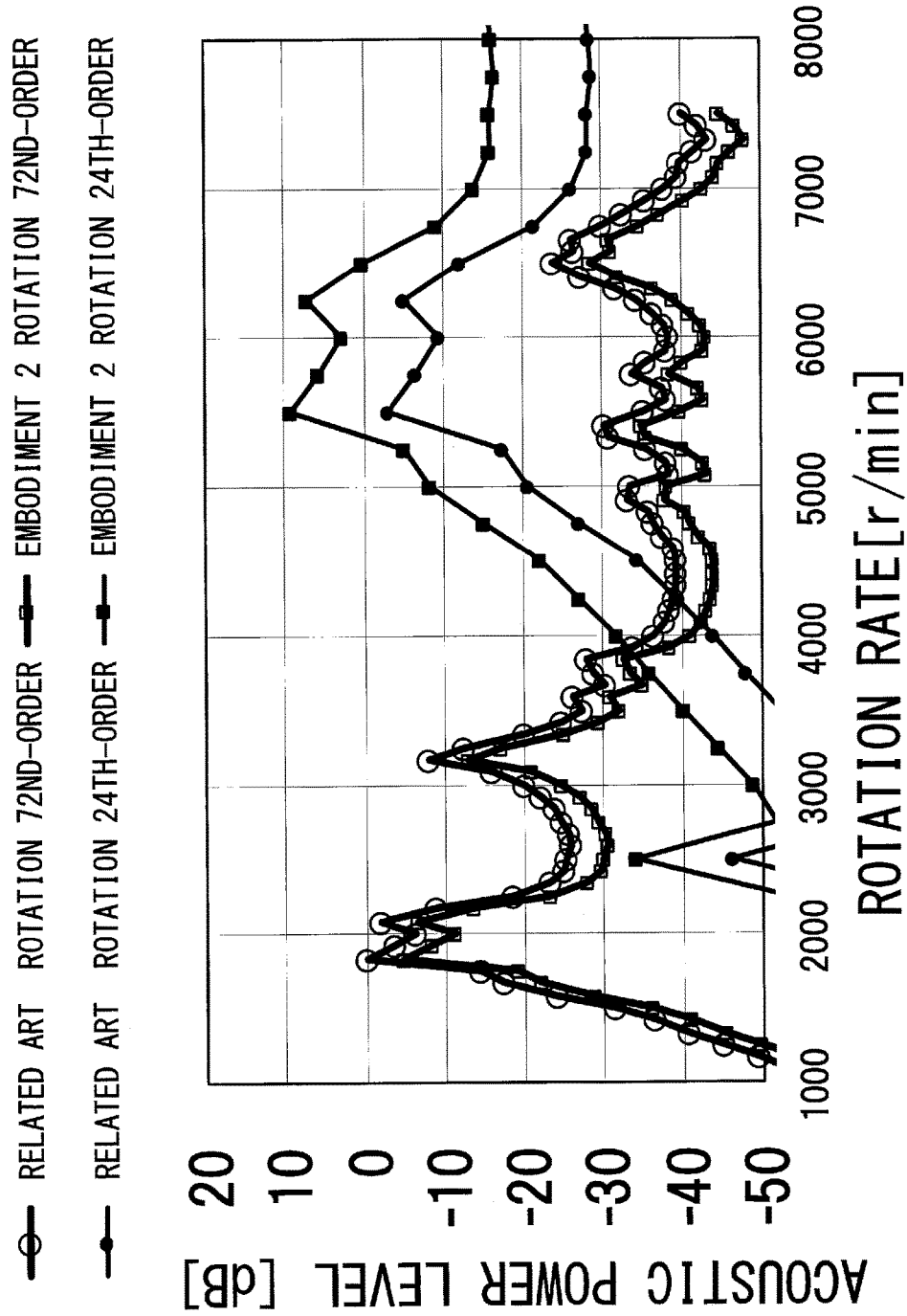

At the same time, as FIG. 7 indicates, the amplitude of the rotation 24th-order harmonic is greater than that of the rotation 72nd-order in embodiment 2. FIG. 10 presents computation results obtained for the levels of acoustic power generated from the rotating electric machines in embodiment 2 and the related art, prepared in few of this point. FIG. 10 indicates that the acoustic power level corresponding to the rotation 24th-order peaks in a range equal to or above 5000 rpm and that the acoustic power level peak value is greater than the peak value corresponding to the rotation 72nd-order in the related art by approximately 10 dB.

The extent to which noise from other sound sources such as wind noise and road noise contribute to the overall noise in the vehicle increases as the speed of the vehicle increases. In addition, the noise tolerance value determined based upon the relationship among speed, noise and human perception also goes up at higher speed. Furthermore, when the rotating electric machine is installed in an HEV, the engine is started up as the rotation rate goes up and thus, it is natural to assume that noise from the engine is greater than the electromagnetic noise generated in the rotating electric machine over a range equal to and above 5000 rpm. For these reasons, the acoustic power level of the rotation 24th-order electromagnetic noise exceeding that of the rotation 72nd-order acoustic power level by 10 dB or so is deemed acceptable.

Embodiment 4

Figure 11:
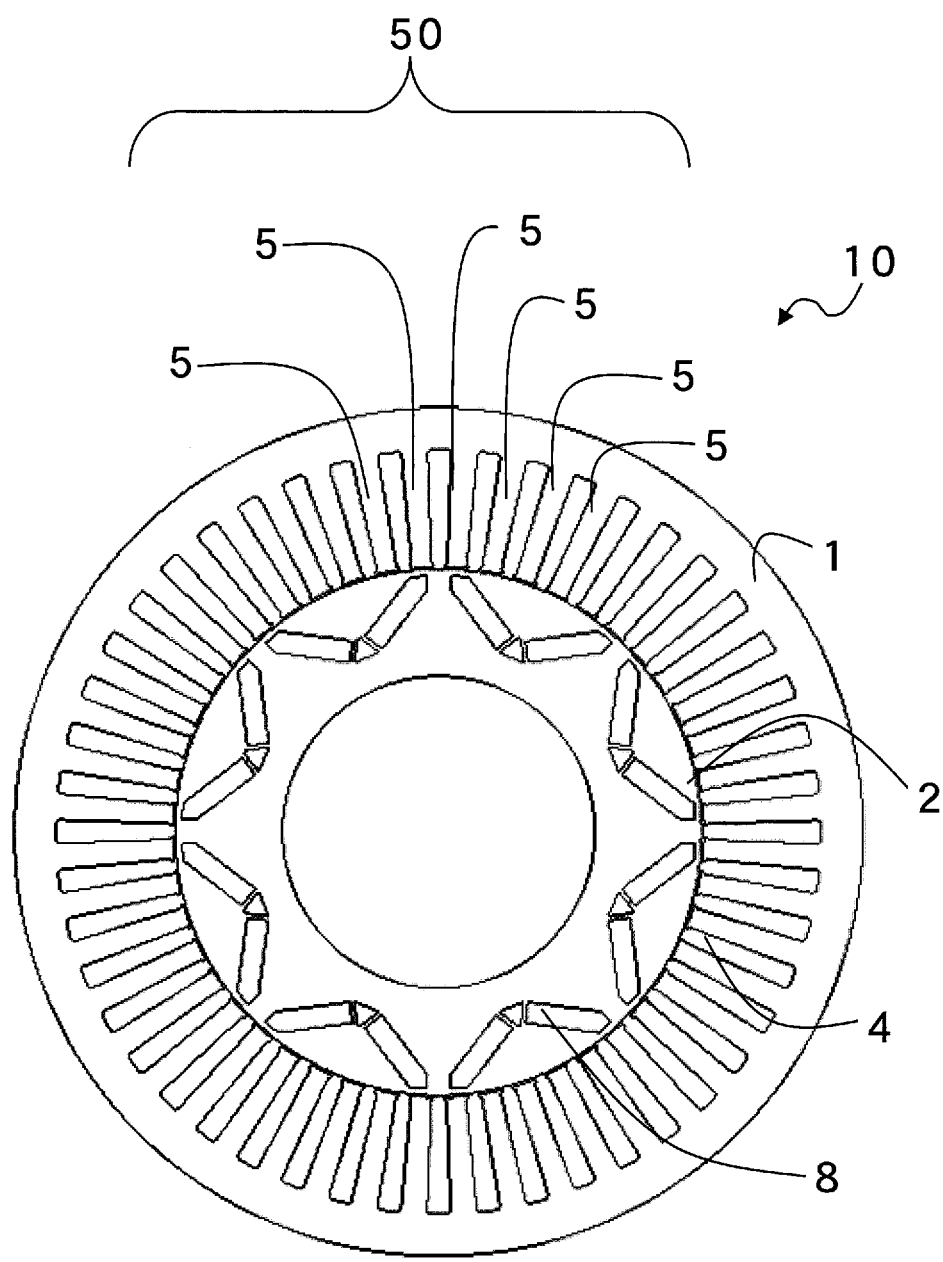

The present invention may be adopted in the three-phase permanent magnet rotating electric machine shown in FIG. 11 with the number of poles P at 8, the number of slots S at 48 and the greatest common divisor N at 8. The present invention in this application example will be compared with the related art. For purposes of simplification, all the teeth in FIG. 11 are indicated by reference numeral 5. Specific reference numerals are also assigned to a stator core (1), a rotor core (2) and magnets (8) in the stator and the rotor configuring the rotating electric machine.

Figure 12:
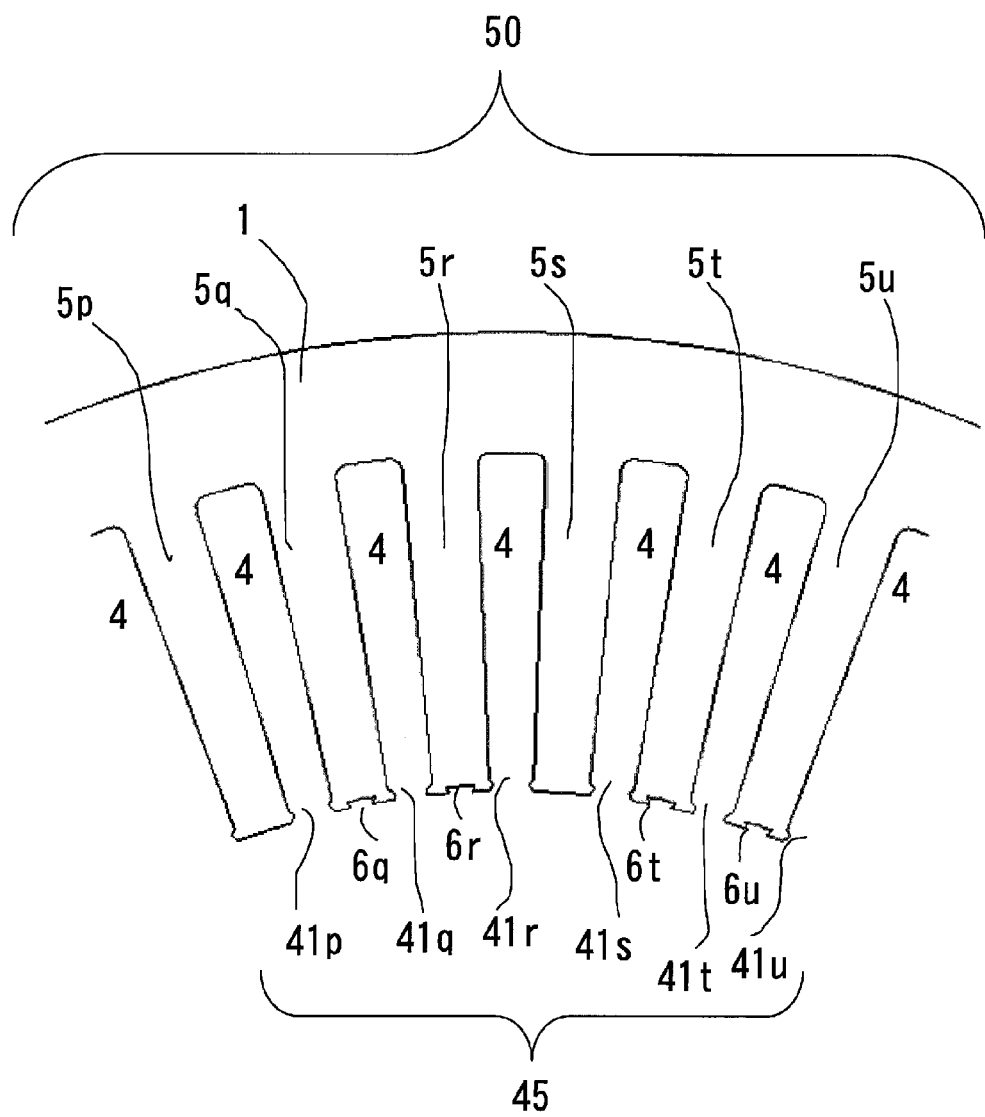

In embodiment 4, a single tooth group 50 is made up with m teeth 5 and m slots 4, with m calculated to be 6 by dividing the number of slots S by the greatest common divisor N (=8) and grooves 6*q*, 6*r*, 6*t* and 6*u* are formed at the front ends of four teeth 5 (5*q*, 5*r*, 5*t*, 5*u*) among these teeth 5 (5*p* through 5*u*) with the openings (41*p* through 41*u*) at the slots 4 having varying opening widths, as illustrated in FIG. 12.

The stator core 1 shown in FIG. 11 is formed by cyclically iterating the group 50 made up with the teeth 5 and the slots 4 arranged as shown in FIG. 12, so that a total of 8 groups are set along the circumferential direction at the stator core 1. Computation results obtained for a rotating electric machine having this stator core 1 (embodiment 4) are indicated by □ marks in FIG. 13, whereas computation results for a rotating electric machine having the stator core 1 in the related art are indicated with ♦ marks in FIG. 13.

In embodiment 4, the tooth group 50 and a slot group 45 corresponding to the tooth group 50, formed as shown in FIG. 12, are iterated over the entire circumference of the stator core 1 shown in FIG. 11 and, as a result, the amplitudes of the electromagnetic force harmonics can be adjusted as in embodiments 1 through 3 without having to alter the periodic boundary conditions of the geometric configuration achieved as a combination with the rotor core 2 and the magnets 8 from the periodic boundary conditions defined by the value ⅛ in the related art.

In embodiment 4, as well, the reluctance in the air gap (the space between the inner circumference of the stator core 1 and the outer circumference of the rotor core 2) can be varied by forming grooves at the front ends of teeth 5 and altering the opening width at the slot openings, as in embodiments 1 through 3. As the reluctance is altered, the amplitudes or the phases of the magnetic flux harmonics change, which, in turn, results in a change in the amplitudes of the electromagnetic force harmonics.

FIG. 13 presents results obtained through analysis, indicating the electromagnetic force harmonic amplitudes of the 0th-order in space along the tangential direction at rotating electric machines having stator cores 1 with the teeth and the slots thereof formed as in embodiment 4 and in the related art. In FIG. 13, the electromagnetic force harmonic amplitudes are rendered dimensionless in reference to the rotation 48th-order harmonic amplitude in the related art. FIG. 13 indicates that the rotation 48th-order harmonic amplitude can be reduced through embodiment 4 relative to that in the related art. In addition, smaller harmonic amplitudes are achieved for other harmonics through embodiment 4 relative to the rotation 48th-order harmonic amplitude in the related art, indicating that an overall reduction in vibration and noise is achieved.

FIG. 14 presents computation results obtained with regard to levels of acoustic power generated from rotating electric machines, one equipped with a stator core 1 having teeth and slots formed as in embodiment 4 and another equipped with a stator core 1 having teeth and slots formed as in the related art, by inputting an electromagnetic force harmonic of the rotation 48th-order. In FIG. 14, the acoustic power levels are rendered dimensionless in reference to the acoustic power level maximum value in the related art. FIG. 14 indicates that the acoustic power level peak manifesting in the vicinity of 3000 rpm is lowered relative to the acoustic power level peak in the related art.

Embodiments 1 through 4 described above may be summarized as follows. According to the present invention, the shape of the tooth front end area and the slot opening width are cyclically altered F times (F is a natural number equal to or greater than 2) along the circumferential direction and, as a result, the amplitudes of harmonics of the electromagnetic exciting force occurring along the tangential direction, which are bound to adversely affect vibration and noise conditions, can be reduced without having to change the periodic boundary conditions. Though not mentioned earlier, it has been learned that the structure of the rotating electric machine according to the present invention may be adopted in an 8-pole/12-slot rotating electric machine or an 8-pole/10-slot rotating electric machine, as well.

As explained above, according to the present invention, the tangential direction space 0th-order electromagnetic force harmonic amplitudes, which are bound to affect the vibration and noise conditions, can be reduced and thus, vibration and noise can be reduced.

In addition, even in a rotating electric machine having a combination of the number of poles and the number of slots not conforming to the stipulations set forth in PTL 1 (the number of slots corresponding to n poles and s phases be 2n×s), the tangential direction electromagnetic force harmonic amplitudes can be reduced by adopting the present invention to ultimately result in a reduction in vibration and noise.

It is to be noted that the embodiments described above simply represent examples and the present invention is in no way limited to these examples as long as the features characterizing the present invention remain intact. Any other mode conceivable by persons skilled in the art within the technical range of the present invention should, therefore, be considered to be within the scope of the present invention.

The present invention is particularly noteworthy in that it may be adopted in various types of rotating electric machines, each equipped with a stator made up with tooth groups having a specific combination of different stator tooth front end shapes and slot opening widths, as has been described in reference to embodiments 1 through 4. This means that the present invention is not limited to applications in rotating electric machines with the number of phases, the number of poles and the number of slots set as in the embodiments described above. It is to be noted that while the embodiments have been described by assuming that coils are wound at the individual stator teeth through a distributed winding method, the present invention may instead be adopted in conjunction with coils wound through concentrated winding or in conjunction with specific dispersal winding methods such as that described in Japanese Laid Open Patent Publication No. 2009-247196.

REFERENCE SIGNS LIST

1: stator core
2: rotor core
4, 4a~4o: stator slot
5, 5a~5l, 15: stator tooth
6, 6a~6h, 6k, 6l, 6n, 6o, 6q, 6r, 6t, 6u: tooth groove
8: permanent magnet
9: conductor
10: rotating electric machine
15: standard stator tooth in related art
21: power semiconductor
38: diode
40, 43, 44, 45: single group of stator slots
42: subgroup in stator slot group 40
41, 41a~41u: slot opening
50, 51: single group of stator teeth

The invention claimed is:

1. A rotating electric machine, comprising:
a stator that includes a plurality of teeth and a plurality of slots, wherein:
a shape of front ends of the teeth and an opening width of the slots are made to change cyclically F times (F is a natural number equal to or greater than 2) along a circumferential direction, wherein
the F represents a greatest common divisor N of a number of poles P and a number of slots S at the stator,
the teeth are grouped into a plurality of tooth groups, a quantity of which matches a value m obtained by dividing the number of slots S by the greatest common divisor N or a divisor d of the value m, the slots are grouped into a plurality of slot groups, a quantity of which matches the value m or a value taken for the divisor d, the plurality of tooth groups have structures identical to one another, and the plurality of slots groups have structures identical to one another, and
the teeth in every single group include a tooth having a groove formed only at the front end thereof and a tooth having no groove anywhere thereon, and the slots in every single group include those with varying opening widths.

2. The rotating electric machine according to claim 1, wherein:
the tooth groups each include at least one slot having an opening width different from other slots in the slot group.

3. An electrically driven vehicle, comprising:
a rotating electric machine according to claim 1.

* * * * *